US005682641A

United States Patent [19]

Newman, Jr. et al.

[11] Patent Number: 5,682,641

[45] **Date of Patent: *Nov. 4, 1997**

[54] TOOL HANDLE WITH LOCKING ASSEMBLY

[75] Inventors: Robert D. Newman, Jr.; Robert D. Newman, Sr., both of P.O. Box 377, Greenwood, Mo. 64034; Buford Guittar, Greenwood, Mo.

[73] Assignees: Robert D. Newman, Sr.; Robert D. Newman, Jr., both of Greenwood, Mo.

[ * ] Notice: The term of this patent shall not extend beyond the expiration date of Pat. No. 5,579,558.

[21] Appl. No.: 623,275

[22] Filed: Mar. 28, 1996

Related U.S. Application Data

[63] Continuation-in-part of Ser. No. 496,577, Jun. 29, 1995, Pat. No. 5,579,558.

[51] Int. Cl.$^6$ .......... B65G 1/04

[52] U.S. Cl. .......... 16/115; 15/144.4; 403/359; 81/177.1

[58] Field of Search .......... 16/115, 110.5, 16/DIG. 41, DIG. 25; 15/144.4; 403/109, 378, 359; 81/177.1, 489

[56] References Cited

U.S. PATENT DOCUMENTS

| | | | |
|---|---|---|---|
| 1,707,353 | 4/1929 | Fraser | 403/359 |
| 2,949,304 | 8/1960 | Williams | 403/359 |
| 3,024,031 | 3/1962 | Davidson | 16/115 |
| 3,173,462 | 3/1965 | Koepel | 403/359 |
| 3,279,835 | 10/1966 | Krohm | 403/359 |
| 3,375,044 | 3/1968 | Peterson | 16/115 |
| 3,380,097 | 4/1968 | Pharris | 403/359 |
| 4,196,491 | 4/1980 | Baril | 15/144.4 |
| 4,238,164 | 12/1980 | Mazzolla | 403/109 |
| 4,325,157 | 4/1982 | Balint et al. | 16/115 |
| 4,466,152 | 8/1984 | Moss et al. | 15/144.4 |
| 4,793,646 | 12/1988 | Michaud, Jr. | 16/115 |
| 5,220,707 | 6/1993 | Newman, Sr. et al. | 16/115 |
| 5,226,198 | 7/1993 | Martin | 81/489 |
| 5,419,217 | 5/1995 | Umezawa et al. | 403/359 |

*Primary Examiner*—Chuck Y. Mah

*Attorney, Agent, or Firm*—Hovey, Williams, Timmons & Collins

[57] ABSTRACT

An extension handle is provided for extending the reach of a tool such as a paint roller or the like. The handle includes a first end presenting an axial opening, and is provided with a locking mechanism for locking the tool on the extension handle. The locking mechanism includes a housing supported on the extension handle at the first end and including a stepped inner surface presenting a plurality of axially extending teeth. A pin is supported by the housing for shifting movement in a direction transverse to the length of the extension handle between a locked position extending into the opening and an unlocked position withdrawn from the opening, and a biasing member biases the pin toward the locked position. A release button releases the biasing member and shifts the pin to the unlocked position. The extension handle is adapted for use with a special tool having a handle presenting a free end that is sized for receipt in the axial opening of the extension handle and that includes a cavity within which the pin is received when the handle is positioned in the axial opening and the pin is in the locked position. However, through the use of adapters, the extension handle can also be used with conventional tools having handles presenting internally threaded open ends or quick-release mechanisms.

21 Claims, 2 Drawing Sheets

TOOL HANDLE WITH LOCKING ASSEMBLY

RELATED APPLICATIONS

The present application is a Continuation-in-Part application of U.S. Ser. No. 08/496,577, filed 29 Jun. 1995, now U.S. Pat. No. 5,579,558.

BACKGROUND OF THE INVENTION

1. Field of the Invention

The present invention relates generally to hand tools and, more particularly, to an extension handle apparatus for extending the reach of hand tools such as paint rollers, squeegees, brushes and the like.

2. Discussion of the Prior Art

It is known to provide extension handles for extending the reach of hand tools such as paint rollers, squeegees, brushes and the like so that the tools can be employed in hard to reach areas such as at heights above the normal reach of a worker. In order to enable the use of a hand tool with such an extension handle, it is conventional to construct the tool with a hollow, internally threaded handle, and to design the extension handle with an externally threaded male end adapted for threaded receipt in the tool handle. In this manner, the extension handle can be attached to the tool by threading it into the tool handle. However, there is a tendency for the tool to twist on the handle during use such that the tool becomes unscrewed and falls off of the extension handle.

Another known extension handle construction is designed specifically for use with a special tool having a handle adapted for connection with the extension handle. The tool handle presents an open end sized for receipt of the extension handle and a quick-release mechanism is provided for securing the tool on the extension handle and for selectively releasing the extension handle. However, because the extension handle is designed specifically for use with a particular tool design, it cannot be used with conventional tools having an internally threaded handle.

OBJECTS AND SUMMARY OF THE INVENTION

It is an object of the present invention to provide a tool reach extension apparatus in which attachment and removal of the tool is simplified by the provision of a release button for releasing the tool from locking engagement with the extension handle.

It is another object of the invention to provide an apparatus including an extension handle adapted not only for use with a special tool, but also for use with any of a plurality of different tool constructions having various configurations, and to provide adapters capable of adapting the extension handle for use with such tools.

In accordance with these and other objects evident from the following description of a preferred embodiment of the invention, an apparatus is provided for use in extending the reach of a tool. The apparatus includes an elongated extension handle including a first end presenting an axial opening, and a locking means for locking the tool on the first end of the extension handle. The locking means includes a generally tubular housing supported on the extension handle at the first end and including an inner surface that is stepped, presenting a large diameter section sized for receipt on the extension handle and a small diameter section extending axially from the first end of the extension handle. The small diameter section presents a plurality of axially extending teeth spaced circumferentially from one another.

A pin is supported by the housing for shifting movement in a direction transverse to the length of the extension handle between a locked position extending into the opening and an unlocked position withdrawn from the opening, as is a biasing means for biasing the pin toward the locked position, and a release means for releasing the biasing means and shifting the pin to the unlocked position. The pin in the locked position prevents the tool from being pulled from the extension handle.

By providing a construction in accordance with the present invention, numerous advantages are realized. For example, by providing an extension handle with a locking means having a pin biased toward the locking position, it is possible to insert and lock a tool in place on the extension handle without pushing a pin, button or lever. In addition, by providing a release means for unlocking the pin, the tool or adaptor can be easily and quickly released with the push of a button, and it is not necessary to unscrew the tool as required with conventional extension handles. The pin also holds the tool or adaptor against both longitudinal and rotational movement relative to the extension handle, removing slack or play in the connection.

Through the use of an appropriate adaptor, the apparatus is capable of use with a conventional tool having an internally threaded handle. The adaptor includes a first end that is externally threaded for receipt in the open end of the tool handle, and a second end that is sized for receipt in the axial opening of the extension handle. The second end of the adapter includes an outer circumferential surface in which a cavity is formed, the cavity being aligned with and receiving the pin when the adapter is positioned in the axial opening and the pin is in the locked position so that the adapter is prevented from being pulled from the extension handle. The circumferential surface of the second end of the adapter includes at least one axially extending tooth that engages the teeth on the small diameter section of the housing so that the adapter is prevented from being rotated relative to the extension handle.

The apparatus may also be used with other available quick-release extension tools through the use of an adaptor having a first end that is sized for receipt in the open end of the tool handle and adapted for engagement by the quick release mechanism. The adaptor also includes a second end that is sized for receipt in the axial opening of the first extension handle and includes an outer circumferential surface in which a cavity is formed, the cavity being aligned with and receiving the pin when the adaptor is positioned in the axial opening and the pin is in the locked position so that the adaptor is prevented from being pulled from the second extension handle. The circumferential surface includes at least one axially extending tooth that engages the teeth on the small diameter section of the housing when the adaptor is positioned in the axial opening so that the adaptor is prevented from being rotated relative to the second extension handle.

Thus, the unique adapter construction permits the adapter to be secured in place on the extension handle against both axial and rotational movement so that any tool supported on the adapter is held in place relative to the extension handle during use.

BRIEF DESCRIPTION OF THE DRAWING FIGURES

The preferred embodiment of the invention is described in detail below with reference to the attached drawing figures, wherein.

DETAILED DESCRIPTION OF A PREFERRED EMBODIMENT

Figures 1, 2, 3, 4, 5, 6, 7, 8, 9:
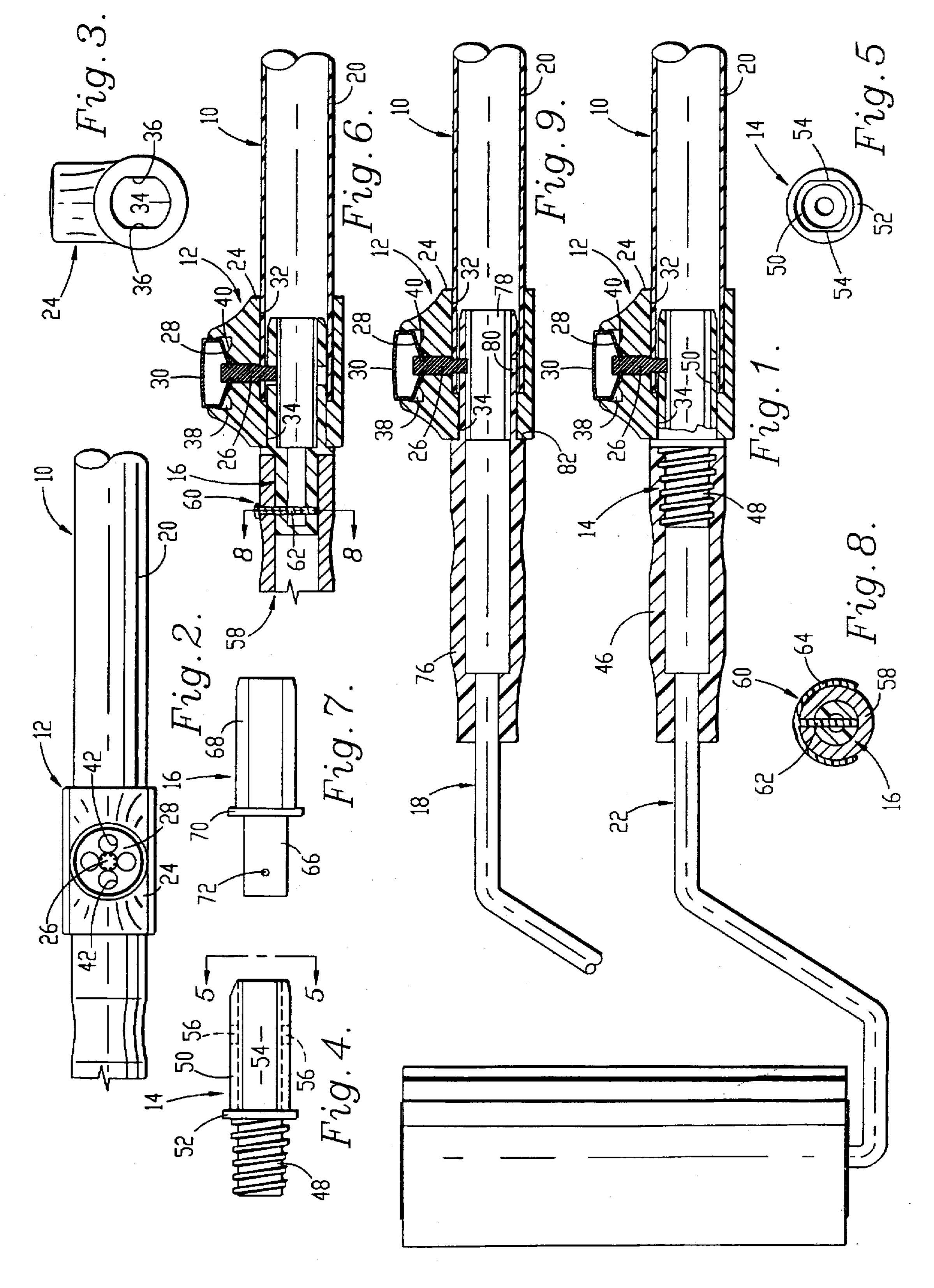
FIG. 1 is a side sectional view of an extension apparatus and adaptor constructed in accordance with a first preferred embodiment of the present invention, illustrating the apparatus secured to a conventional tool having an internally threaded handle.
FIG. 2 is a fragmentary top plan view of the apparatus, illustrating a locking assembly of the apparatus with a release button of the assembly removed.
FIG. 3 is an end elevational view of a housing of the locking assembly.
FIG. 4 is a side elevational view of the adaptor.
FIG. 5 is an end elevational view of the adaptor.
FIG. 6 is a side sectional view of the apparatus, illustrating a second type of adaptor for use with a conventional tool having an open ended handle having a quick release mechanism.
FIG. 7 is a side elevational view of the second type of adaptor.
FIG. 8 is a sectional view through line 8—8 of FIG. 6.
FIG. 9 is a side sectional view of the apparatus, illustrating a tool constructed in accordance with the present invention for use with the first preferred extension apparatus.

An extension apparatus constructed in accordance with a first preferred embodiment is illustrated in FIGS. 1–9 of the drawing, and an apparatus constructed in accordance with a second preferred construction is shown in FIGS. 10–16. With reference to FIG. 1, the first embodiment broadly includes an elongated extension handle 10, and a locking means 12 for locking a tool on the end of the extension handle. The apparatus is shown in FIGS. 1–5 in use with an adaptor 14 for permitting the extension apparatus to be used with a conventional tool having an internally threaded handle. A second type of adaptor 16 is illustrated in FIGS. 6–8, and permits the extension apparatus to be used with a conventional tool having a handle provided with a quick release mechanism. As shown in FIG. 9, a tool 18 can also be constructed with a custom handle that fits directly on the extension apparatus so that no adaptor is required.

Returning to FIG. 1, the extension handle 10 includes an elongated tubular member 20 formed of metal or any other suitable material capable of supporting the tool 22 at one end thereof while permitting a user to grip the opposite end of the member and manipulate the tool. The end of the extension handle is open, and a transverse hole extends through the side wall of the member 44 at a location spaced slightly from the end of the member.

Preferably, the extension handle includes a pair of handle members, one of which is telescopically received in the other so that the length of the extension handle can be adjusted. An example of such an extension handle is illustrated in U.S. Pat. No. 5,220,707 to Newman, Sr., et al., incorporated herein by this express reference.

The locking means 12 includes a housing 24, a pin 26, a biasing member 28 and a release button 30. The housing 24 is supported on the extension handle at the open end thereof, and is secured to the handle member against relative shifting movement. Although it is preferred that the housing be assembled on the extension handle at the time of manufacture of the handle, it is also possible to retrofit the locking means on an existing extension handle or to form the extension handle with an integral housing.

The housing 24 presents a T-shaped configuration including a tubular portion sized for receipt on the end of the handle member, and an upstanding rim protruding from the tubular portion. The inner diameter of the tubular portion is stepped, presenting a large diameter section 32 having a diameter about equal to or slightly less than the outer diameter of the handle member, and a small diameter section 34 presenting a stop or shoulder against which the end of the handle member abuts when the housing is assembled on the member. The small diameter section is non-circular in cross-sectional shape, as shown in FIG. 3, and preferably includes a pair of flat side faces that align the locking means with the tool or adaptor to be connected to the extension handle.

The upstanding rim of the housing 24 includes a central depression 38 and a hole collinear with the transverse hole of the handle member within which the pin is received. The depression 38 includes a generally circular bottom wall on which an annular ridge 40 is formed. The ridge is spaced radially from the hole and defines a fulcrum against which the biasing member 28 is forced during operation of the locking means, as described below. The depression also includes a cylindrical side wall that is sized for receipt of the biasing member and the release button 30. Preferably, the side wall of the depression 38 is undercut and the button 30 is formed with a pair of diametrically opposed, radially protruding lips so that the button is retained in the depression once assembled on the housing.

The pin 26 is supported by the housing for shifting movement in a direction transverse to the length of the extension handle between a locked position extending into the interior of the handle member, as shown in FIG. 1, and an unlocked position withdrawn from the opening. The pin is formed of metal, plastic, or any other suitable material, and can be round, square, rectangular or other shape. The pin includes a lower stepped portion having a diameter substantially equal to the diameter of the transverse hole in the handle member. The remaining portion of the pin is of a larger diameter and prevents the pin from extending into the extension handle beyond the lower stepped portion. In addition, a circumferential groove is formed adjacent the end of the pin opposite the lower stepped portion. The groove is adapted to receive the biasing member 28 and to retain the biasing member on the pin as the pin is moved between the locked and unlocked positions.

The biasing member 28 is a cupped-shaped washer formed of plastic, metal or the like, and includes a central aperture sized for receipt in the circumferential groove of the pin 26, and a plurality of bias relief holes 42, shown in FIG. 2, extending radially from the central aperture. The biasing member presents an upper concave face and a lower convex face. The bias relief holes 42 weaken the bias of the member to a level sufficient to permit shifting of the member between the locked position illustrated in FIG. 1 and an unlocked position in which the biasing member is pivoted about the fulcrum ridge to pull the pin from the extension handle.

The release button 30 includes a lower edge having a diameter about equal to the diameter of the outer edge of the biasing member. As the button is depressed, it exerts a force on the outer circumferential edge of the biasing member that is counteracted by an upward force exerted by the fulcrum ridge 40. When the downward force reaches a magnitude sufficient to pivot the biasing member about the ridge, the biasing member snaps into the unlocked position. This movement of the biasing member lifts the pin into the depression, withdrawing the pin into the transverse hole the depression, withdrawing the pin into the transverse hole of the extension handle member. Thereafter, when the button 30 is released, the force exerted on the biasing member by the fulcrum ridge 40 causes the member to return to the locked position shown in FIG. 1.

In order to permit use of the extension handle with a conventional tool 22 having an internally threaded handle 46, illustrated as a paint roller in FIG. 1, the adaptor 14 is provided. The adaptor is shown in FIG. 4, and includes a first end 48 designed to attach to the handle 46 of the tool and a second end 50 designed to attach to the extension handle 10. A circumferential flange 52 separates the ends from one another and defines a stop against which both the tool handle and extension handle bear upon assembly of the apparatus.

Preferably, the first end 48 of the adaptor 14 is externally threaded so that it can be threaded into and out of the handle 46 prior to securing the tool to the extension handle. The major diameter of the adaptor threads corresponds to the major diameter of the female threads in the handle 46. However, the major diameter of the adaptor threads adjacent the flange 52 is larger than along the remainder of the adaptor so that as the adaptor is screwed into the tool handle 46, the threads on the adaptor grip the handle, locking the two parts together.

The second end 50 of the adaptor 14 is tubular, including a non-circular cross-sectional shape corresponding to the cross-sectional shape of the small diameter section 34 of the housing 24 so that the adaptor 14 must be properly aligned with the extension handle before the adaptor can be pushed into the housing. Preferably, the second end 50 includes opposing flat side faces 54, illustrated in FIG. 5, corresponding to the side faces 36 of the small diameter housing section 34, shown in FIG. 3. Returning to FIG. 4, transverse holes 56 extend through the adaptor wall on opposite sides of the adaptor. The holes 56 are spaced circumferentially from the side faces 54 by an angle of 90°relative to the longitudinal axis of the adaptor. Alternately, the holes may be slots, grooves or any other type of depression sized for receipt of the pin 26.

The tip of the second end 50 of the adaptor 14 is tapered to guide movement of the adaptor into the end of the extension handle member 20 and past the pin 26 so that the pin rides over the adaptor and snaps into one of the holes when the adaptor is seated against the housing. Thereafter, the adaptor 14 is locked to the extension handle and cannot either twist or be moved longitudinally relative to the extension handle. In order to unlock the adaptor 14, it is necessary only to depress the button 30 until the biasing member 28 lifts the pin 26 from the hole in the adaptor. Thereafter, the adaptor may be pulled from the extension handle to release the tool.

In order to permit use of the extension handle with a tool 58, provided with a quick release mechanism, the adaptor 16 is provided, as illustrated in FIG. 6. The handle of the tool 58 is hollow and includes a transverse hole within which a snap button 60 is received. Normally, a conventional extension handle is provided which includes a male end sized for receipt in the handle and formed with a transverse hole positioned for alignment with the hole in the handle so that the snap button extends through both holes to hold the tool on the extension handle. As shown in FIG. 8, the snap button 60 includes a pin 62 supported on a crescent-shaped spring clip 64, wherein the spring clip is formed of a diameter smaller than the diameter of the tool handle. Thus, the spring clip grips the handle of the tool 58 when the pin is inserted through the holes.

The adaptor 16 is illustrated in FIG. 7, and includes a first end 66 designed to attach to the handle of the tool and a second end 68 designed to attach to the extension handle. A circumferential flange 70 separates the ends from one another and defines a stop against which both the tool handle and extension handle bear upon assembly of the apparatus.

Preferably, the first end 66 of the adaptor 16 is tubular or cylindrical and includes a transverse hole 72 sized to receive the pin 62 of the snap button 60. The second end 68 of the adaptor is identical in construction to the second end 50 of the adaptor 14. In order to secure the adaptor 16 to the tool handle of the tool 58, the first end 66 of the adaptor is inserted into the handle so that the hole 72 in the adaptor is aligned with a corresponding hole in the handle. Thereafter, the snap button 60 is secured to the handle with the pin extending into the holes, locking the adaptor to the tool. The tool is secured to the extension handle 10 by inserting the second end 68 of the adaptor 16 into the housing until the flange 70 seats against the housing with one of the transverse holes in the adaptor aligned with the pin 26. With the pin seated in one of the holes, the tool 58 is locked against twisting or longitudinal movement relative to the extension handle 10.

The tool 18, shown in FIG. 9, is constructed in accordance with the preferred embodiment and includes a construction which obviates the need for a separate adaptor. The tool 18 includes a hollow tubular handle 76 including a free end that is sized for receipt in the axial opening of the extension handle 10 and is of a cross-sectional shape corresponding to the cross-sectional shape of the small diameter section 34 of the housing 24. The handle is preferably integral with the tool, but could alternately be attached to the tool by rivets, screws, an adhesive, or a threaded connection or the like. Preferably, the free end of the handle 76 includes opposing flat side faces 78 corresponding to the side faces 36 of the small diameter housing section 34, and a transverse hole 80 extends through the tool handle. The hole is spaced circumferentially from the side faces 78 by an angle of 90° relative to the longitudinal axis of the handle. The tool 18 is secured to the extension handle 10 by inserting the free end of the handle into the housing until the handle seats against the housing with the hole 80 in the free end aligned with the pin 26. With the pin seated in the hole 80, the tool is locked against twisting or longitudinal movement relative to the extension handle. Preferably, the free end of the handle is stepped to define a stop surface 82 that seats against the housing when the handle is locked on the extension handle.

Figures 10, 11, 12, 13, 14, 15, 16:
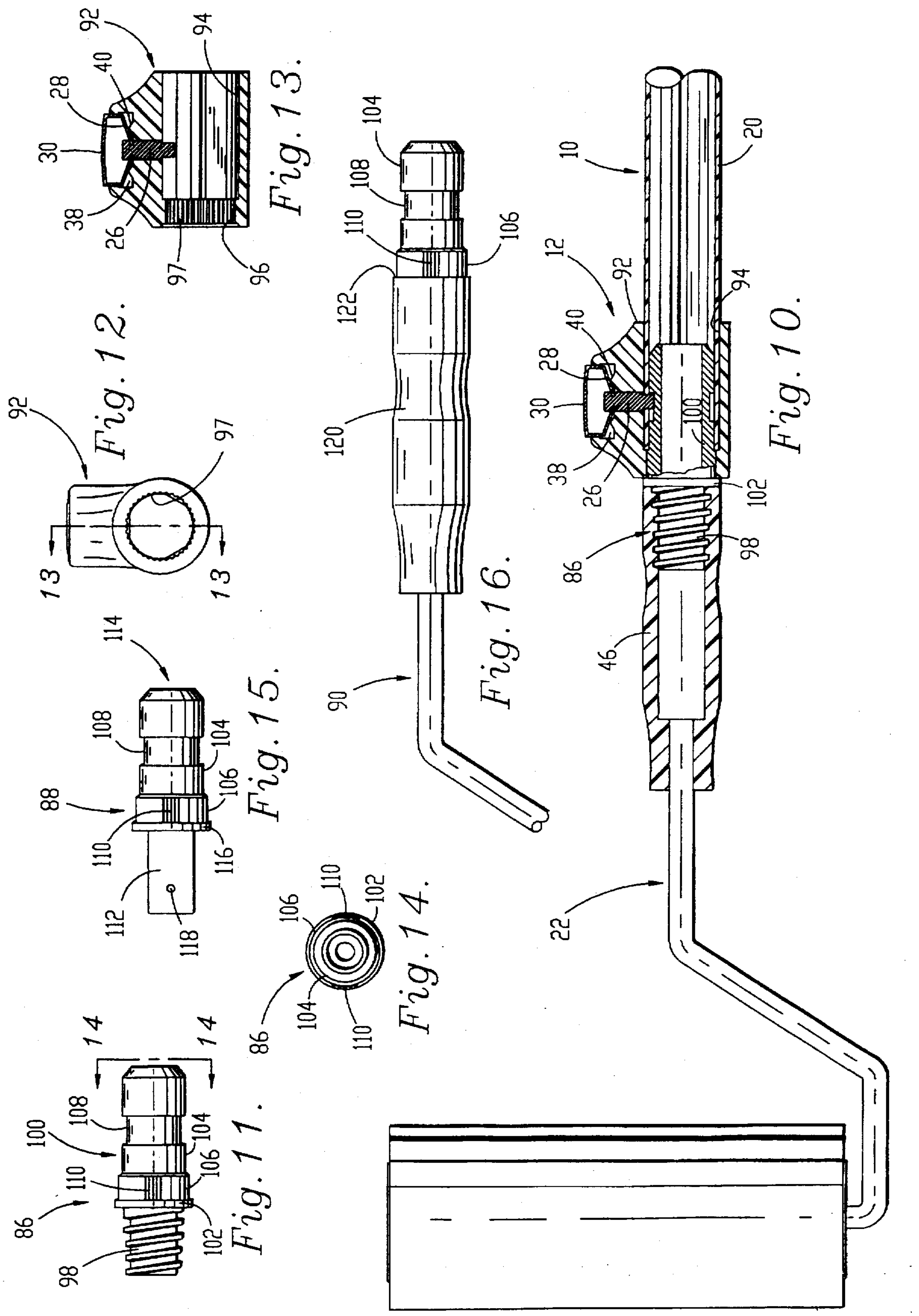
FIG. 10 is a side sectional view of an extension apparatus and adaptor constructed in accordance with a second preferred embodiment of the present invention, illustrating the apparatus secured to a conventional tool having an internally threaded handle.
FIG. 11 is a side elevational view of a third type of adapter.
FIG. 12 is an end elevational view of a housing of the locking assembly.
FIG. 13 is a sectional view taken along line 13—13 of FIG. 12.
FIG. 14 is an end elevational view of the third type of adapter, taken along line 14—14 of FIG. 11.
FIG. 15 is a side elevational view of a fourth type of adapter.
FIG. 16 is a side elevational view of a tool constructed in accordance with the present invention for use with the second preferred extension apparatus.

With reference to FIG. 10, the second embodiment broadly includes an elongated extension handle 10, and a locking means 12 for locking a tool on the end of the extension handle. The apparatus is shown in FIGS. 10–14 in use with an adaptor 86 for permitting the extension apparatus to be used with a conventional tool having an internally threaded handle. A second type of adaptor 88 is illustrated in FIG. 15, and permits the extension apparatus to be used with a conventional tool having a handle provided with a quick release mechanism such as that shown in FIGS. 6 and 8. As shown in FIG. 16, a tool 90 can also be constructed with a custom handle that fits directly on the extension apparatus so that no adaptor is required.

Returning to FIG. 10, the extension handle 10 includes an elongated tubular member 20 as described above, including a first end including an axial opening, and a transverse hole through the side wall of the member at a location spaced slightly from the end of the member. The locking means 12 includes a housing 92, a pin 26, a biasing member 28 and a release button 30. The housing 92 is supported on the extension handle at the open end thereof, and is secured to the handle member against relative shifting movement. Although it is preferred that the housing be assembled on the extension handle at the time of manufacture of the handle, it is also possible to retrofit the locking means on an existing extension handle or to form the extension handle with an integral housing.

As shown in FIG. 13, the housing 92 presents a T-shaped configuration including a tubular portion sized for receipt on the end of the handle member, and an upstanding rim protruding from the tubular portion. The inner diameter of the tubular portion is stepped, presenting a large diameter section 94 having a diameter about equal to or slightly less than the outer diameter of the handle member, and a small diameter section 96 presenting a stop or shoulder against which the end of the handle member abuts when the housing is assembled on the member. The small diameter section is generally circular in cross-sectional shape, as shown in FIG. 12, but presents a plurality of axially extending teeth 97 around the inner circumference of the section. Thus, the resulting shape is actually non-circular, and functions with the adapter in a manner described below to secure the adapter in place on the housing against relative rotational movement.

Returning to FIG. 13, the upstanding rim of the housing 92 includes a central depression 38 and a hole collinear with the transverse hole of the handle member within which the pin is received. The depression 38 includes a generally circular bottom wall on which an annular ridge 40 is formed. The ridge is spaced radially from the hole and defines a fulcrum against which the biasing member 28 is forced during operation of the locking means, as described below. The depression also includes a cylindrical side wall that is sized for receipt of the biasing member and the release button 30. Preferably, the side wall of the depression 38 is undercut and the button 30 is formed with a pair of diametrically opposed, radially protruding lips so that the button is retained in the depression once assembled on the housing.

The pin 26 is supported by the housing for shifting movement in a direction transverse to the length of the extension handle between a locked position extending into the interior of the handle member, as shown in FIG. 10, and an unlocked position withdrawn from the opening. The pin is formed of metal, plastic, or any other suitable material, and can be round, square, rectangular or other shape. The pin includes a lower stepped portion having a diameter substantially equal to the diameter of the transverse hole in the handle member. The remaining portion of the pin is of a larger diameter and prevents the pin from extending into the extension handle beyond the lower stepped portion. In addition, a circumferential groove is formed adjacent the end of the pin opposite the lower stepped portion. The groove is adapted to receive the biasing member 28 and to retain the biasing member on the pin as the pin is moved between the locked and unlocked positions.

The biasing member 28 is a cupped-shaped washer formed of plastic, metal or the like, and includes a central aperture sized for receipt in the circumferential groove of the pin 26, and a plurality of bias relief holes 42, identical to those shown in FIG. 2, which extend radially from the central aperture. The biasing member presents an upper concave face and a lower convex face. The bias relief holes 42 weaken the bias of the member to a level sufficient to permit shifting of the member between the locked and unlocked positions.

The release button 30 includes a lower edge having a diameter about equal to the diameter of the outer edge of the biasing member. As the button is depressed, it exerts a force on the outer circumferential edge of the biasing member that is counteracted by an upward force exerted by the fulcrum ridge 40. When the downward force reaches a magnitude sufficient to pivot the biasing member about the ridge, the biasing member snaps into the unlocked position. This movement of the biasing member lifts the pin into the depression, withdrawing the pin into the transverse hole of the extension handle member. Thereafter, when the button 30 is released, the force exerted on the biasing member by the fulcrum ridge 40 causes the member to return to the locked position.

In order to permit use of the extension handle with a conventional tool 22 having an internally threaded handle 46, illustrated as a paint roller in FIG. 10, the adaptor 86 is provided. The adaptor is shown in FIG. 11, and includes a first end 98 designed to attach to the handle 46 of the tool and a second end 100 designed to attach to the extension handle 10. A circumferential flange 102 separates the ends from one another and defines a stop against which both the tool handle and extension handle bear upon assembly of the apparatus.

Preferably, the first end 98 of the adaptor 86 is externally threaded so that it can be threaded into and out of the handle 46 prior to securing the tool to the extension handle. The major diameter of the adaptor threads corresponds to the major diameter of the female threads in the handle 46. However, the major diameter of the adaptor threads adjacent the flange 102 is larger than along the remainder of the adaptor so that as the adaptor is screwed into the tool handle 46, the threads on the adaptor grip the handle, locking the two parts together.

The second end 100 of the adaptor 86 is tubular, including a circular cross-sectional shape sized for receipt in the small diameter section 96 of the housing 92 and the axial opening in the extension handle so that the adaptor 86 can be pushed into the housing. Preferably, the second end of the adapter includes a cylindrical outer circumferential surface that is axially stepped to present a small diameter section 104 adjacent the free end of the adapter and a large diameter section 106 extending between the small diameter section and the flange 102. A cavity 108 is provided in the small diameter section 104, and preferably takes the form of an annular channel extending entirely around the adapter and positioned axially for alignment with the pin 26 when the adapter is positioned in the first end of the extension handle.

The tip of the second end 100 of the adaptor 86 is tapered to guide movement of the adaptor into the end of the extension handle member 20 and past the pin 26 so that the pin rides over the adaptor and snaps into the cavity 108 when the adaptor is seated against the housing. Thereafter, the adaptor 86 is locked to the extension handle and cannot be moved longitudinally relative to the extension handle. In order to unlock the adaptor 86, it is necessary only to depress the button 30 until the biasing member 26 lifts the pin 26 from the cavity 108 in the adaptor. Thereafter, the adaptor may be pulled from the extension handle to release the tool.

The large diameter section 106 of the second end of the adapter 86 also presents a cylindrical outer circumferential surface, and two sets of axially extending teeth 110 protrude from the surface, wherein each set is generally diametrically opposed to the other set, as shown in FIG. 14. The teeth 110 on the adapter are of the same size and shape as the teeth 97 of the housing, and are positioned on the adapter for engagement with the teeth of the housing when the adapter is pushed into the housing, as shown in FIG. 10.

In order to permit use of the extension handle with the tool 58 and quick release mechanism described above and illustrated in FIGS. 6 and 8, the adaptor 88 is provided, as illustrated in FIG. 15. The adaptor 88 includes a first end 112 designed to attach to the handle of the tool and a second end 114 designed to attach to the extension handle. A circumferential flange 116 separates the ends from one another and defines a stop against which both the tool handle and extension handle bear upon assembly of the apparatus.

Preferably, the first end 112 of the adaptor 88 is tubular or cylindrical and includes a transverse hole 118 sized to receive the pin of the quick release mechanism. The second end 114 of the adaptor 88 is identical in construction to the second end 100 of the adaptor 86. In order to secure the adaptor 88 to the handle of the tool 58, the first end 112 of the adaptor 88 is inserted into the handle so that the hole 118 in the adaptor is aligned with a corresponding hole in the handle. Thereafter, the quick release mechanism is used to secure the adaptor to the tool. The tool is secured to the extension handle 10 by inserting the second end 114 of the adaptor 88 into the housing until the flange 116 seats against the housing with the cavity 108 in the adaptor aligned with the pin 26. With the pin seated in the cavity 108, the tool 58 is locked against twisting or longitudinal movement relative to the extension handle 10.

The tool 90, shown in FIG. 16, is constructed in accordance with the preferred embodiment and includes a construction which obviates the need for a separate adaptor. The tool 90 includes a hollow tubular handle 120 including a free end that is sized for receipt in the axial opening of the extension handle 10, and is identical in shape to the second end 100 of the adapter 86. The handle 120 is preferably integral with the tool, but could alternately be attached to the tool by rivets, screws, an adhesive, or a threaded connection or the like.

The tool 90 is secured to the extension handle 10 by inserting the free end of the handle into the housing until the handle seats against the housing with the cavity 108 in the free end aligned with the pin 26. With the pin seated in the cavity and the teeth 110 on the free end of the tool engaged with the teeth 97 of the housing 92, the tool 90 is locked against twisting or longitudinal movement relative to the extension handle. Preferably, the free end of the handle is stepped to define a stop surface 122 that seats against the housing when the annular channel 108 is aligned with the pin 26.

Although the present invention has been described with reference to the preferred embodiment illustrated in the attached drawing figures, it is noted that substitutions may be made and equivalents employed herein without departing from the scope of the invention as recited in the claims.

What is claimed is:

1. An apparatus for use in extending the reach of a tool, the apparatus comprising:

an elongated extension handle including a first end presenting an axial opening; and a locking means for locking the tool on the first end of the extension handle, the locking means including a generally tubular housing supported on the extension handle at the first end and including an inner surface that is stepped, the inner surface presenting a large diameter section sized for receipt on the extension handle and a small diameter section extending axially from the first end of the extension handle, the small diameter section presenting a plurality of axially extending teeth spaced circumferentially from one another, a pin supported by the housing for shifting movement in a direction transverse to the length of the extension handle between a locked position extending into the opening and an unlocked position withdrawn from the opening, a biasing means for biasing the pin toward the locked position, and a release means for releasing the biasing means and shifting the pin to the unlocked position, the pin in the locked position preventing the tool from being pulled from the extension handle.

2. An apparatus as recited in claim 1, wherein the housing and the first end of the extension handle include collinear transverse holes within which the pin is supported for movement.

3. An apparatus as recited in claim 2, wherein the transverse hole in the extension handle is smaller than the transverse hole in the housing, and the pin includes a first axial section having a diameter corresponding to the hole in the extension handle and a second axial section having a diameter corresponding to the hole in the housing so that the pin is restricted from extending into the extension handle beyond the first axial section.

4. An apparatus as recited in claim 1, wherein the biasing means includes a biasing member presenting a cupped washer configuration.

5. An apparatus as recited in claim 1, wherein the release means includes a button supported on the housing for movement between the locking position and the unlocking position, the biasing means biasing the button toward the locked position.

6. An apparatus for use in extending the reach of a tool, wherein the tool includes a handle presenting an open end that is internally threaded, the apparatus comprising:

an elongated extension handle including a first end presenting an axial opening;

a generally tubular housing supported on the extension handle at the first end and including an inner surface that is stepped, the inner surface presenting a large diameter section sized for receipt on the extension handle and a small diameter section extending axially from the first end of the extension handle, the small diameter section presenting a plurality of axially extending teeth spaced circumferentially from one another;

a pin supported by the housing for shifting movement in a direction transverse to the length of the extension handle between a locked position extending into the opening and an unlocked position withdrawn from the opening;

a biasing means for biasing the pin toward the locked position;

a release means for releasing the biasing means and shifting the pin to the unlocked position; and an adaptor including a first end that is externally threaded for receipt in the open end of the tool handle and a second end that is sized for receipt in the axial opening of the extension handle, the second end of the adaptor including an outer circumferential surface in which a cavity is formed, the cavity being aligned with and receiving the pin when the adaptor is positioned in the axial opening and the pin is in the locked position so that the adaptor is prevented from being pulled from the extension handle, the circumferential surface of the second end of the adaptor including at least one axially extending tooth that engages the teeth on the small diameter section of the housing when the adaptor is positioned in the axial opening so that the adaptor is prevented from being rotated relative to the extension handle.

7. An apparatus as recited in claim 6, wherein the cavity is a circumferential channel positioned for alignment with the pin when the adaptor is positioned in the first end of the extension handle.

8. An apparatus as recited in claim 7, wherein the second end of the adaptor is cylindrical, and the channel extends entirely around the adaptor.

9. An apparatus as recited in claim 6, wherein the circumferential surface of the second end of the adaptor includes a plurality of axially extending teeth that engage the teeth on the small diameter section of the housing when the adaptor is positioned in the axial opening.

10. An apparatus as recited in claim 6, wherein the adaptor includes a flange separating the first and second ends of the adaptor from one another, the flange being larger than the axial opening of the extension handle so that when the second end of the adaptor is received in the axial opening, the flange abuts the housing, positioning the cavity in alignment with the pin.

11. An apparatus for use in extending the reach of a tool, wherein the tool includes a handle presenting an open end sized for receipt of a first extension handle and a quick release mechanism for releasing the first extension handle from the tool, the apparatus comprising:

an elongated second extension handle including a first end presenting an axial opening;

a generally tubular housing supported on the second extension handle at the first end and including an inner surface that is stepped, the inner surface presenting a large diameter section sized for receipt on the second extension handle and a small diameter section extending axially from the first end of the second extension handle, the small diameter section presenting a plurality of axially extending teeth spaced circumferentially from one another;

a pin supported by the housing for shifting movement in a direction transverse to the length of the second extension handle between a locked position extending into the opening and an unlocked position withdrawn from the opening;

a biasing means for biasing the pin toward the locked position;

a release means for releasing the biasing means and shifting the pin to the unlocked position; and an adaptor including a first end that is sized for receipt in the open end of the tool handle and is adapted for engagement by the quick release mechanism, and a second end that is sized for receipt in the axial opening of the second extension handle, the second end of the adaptor including an outer circumferential surface in which a cavity is formed, the cavity being aligned with and receiving the pin when the adaptor is positioned in the axial opening and the pin is in the locked position so that the adaptor is prevented from being pulled from the second extension handle, the circumferential surface of the second end of the adaptor including at least one axially extending tooth that engages the teeth on the small diameter section of the housing when the adaptor is positioned in the axial opening so that the adaptor is prevented from being rotated relative to the second extension handle.

12. An apparatus as recited in claim 11, wherein the cavity is a circumferential channel positioned for alignment with the pin when the adaptor is positioned in the first end of the second extension handle.

13. An apparatus as recited in claim 12, wherein the second end of the adaptor is cylindrical, and the channel extends entirely around the adaptor.

14. An apparatus as recited in claim 11, wherein the circumferential surface of the second end of the adaptor includes a plurality of axially extending teeth that engage the teeth on the small diameter section of the housing when the adaptor is positioned in the axial opening.

15. An apparatus as recited in claim 11, wherein the adaptor includes a flange separating the first and second ends of the adaptor from one another, the flange being larger than the axial opening of the second extension handle so that when the second end of the adaptor is received in the axial opening, the flange abuts the housing, positioning the cavity in alignment with the pin.

16. An adaptor for use in adapting a tool for use with an extension handle, wherein the tool includes a handle presenting an open end that is internally threaded and the extension handle includes a first end presenting an axially extending opening having a non-circular cross-sectional shape presenting a plurality of axially extending teeth, a pin supported for shifting movement in a direction transverse to the length of the extension handle between a locked position extending into the opening and an unlocked position withdrawn from the opening, a biasing means for biasing the pin toward the locked position, and a release means for releasing the biasing means and shifting the pin to the unlocked position, the adaptor comprising:

a first end that is externally threaded for receipt in the open end of the tool handle; and a second end that is sized for receipt in the axial opening of the extension handle and includes an outer circumferential surface in which a cavity is formed, the cavity being aligned with and receiving the pin when the adaptor is positioned in the axial opening and the pin is in the locked position so that the adaptor is prevented from being pulled from the extension handle, the circumferential surface of the second end of the adaptor including at least one axially extending tooth that engages the teeth on the housing when the adaptor is positioned in the axial opening so that the adaptor is prevented from being rotated relative to the extension handle.

17. An adaptor as recited in claim 16, wherein the cavity is a circumferential channel positioned for alignment with the pin when the adaptor is positioned in the first end of the extension handle.

18. An adaptor for use in adapting a tool for use with a first extension handle, wherein the tool includes a handle presenting an open end sized for receipt of a second extension handle and a quick release mechanism for releasing the second extension handle from the tool, and the first extension handle includes a first end presenting an axially extending opening having a non-circular cross-sectional shape presenting a plurality of axially extending teeth, a pin supported for shifting movement in a direction transverse to the length of the first extension handle between a locked position extending into the opening and an unlocked position withdrawn from the opening, a biasing means for biasing the pin toward the locked position, and a release means for releasing the biasing means and shifting the pin to the unlocked position, the adaptor comprising:

a first end that is sized for receipt in the open end of the tool handle and is adapted for engagement by the quick release mechanism; and a second end that is sized for receipt in the axial opening of the first extension handle and includes an outer circumferential surface in which a cavity is formed, the cavity being aligned with and receiving the pin when the adaptor is positioned in the axial opening and the pin is in the locked position so that the adaptor is prevented from being pulled from the extension handle, the circumferential surface of the second end of the adaptor including at least one axially extending tooth that engages the teeth on the housing when the adaptor is positioned in the axial opening so that the adaptor is prevented from being rotated relative to the extension handle.

19. An adaptor as recited in claim 18, wherein the cavity is a circumferential channel positioned for alignment with the pin when the adaptor is positioned in the first end of the extension handle.

20. A tool for use with an extension handle including a first end presenting an axially extending opening having a non-circular cross-sectional shape presenting a plurality of axially extending teeth, a pin supported for shifting movement in a direction transverse to the length of the extension handle between a locked position extending into the opening and an unlocked position withdrawn from the opening, a biasing means for biasing the pin toward the locked position, and a release means for releasing the biasing means and shifting the pin to the unlocked position, the tool comprising:

a handle presenting a free end that is sized for receipt in the axial opening of the extension handle and includes an outer circumferential surface in which a cavity is formed, the cavity being aligned with and receiving the pin when the free end of the handle is positioned in the axial opening and the pin is in the locked position so that the tool is prevented from being pulled from the extension handle, the circumferential surface of the free end of the handle including at least one axially extending tooth that engages the teeth on the housing when the free end is positioned in the axial opening so that the tool is prevented from being rotated relative to the extension handle.

21. A tool as recited in claim 20, wherein the cavity is a circumferential channel positioned for alignment with the pin when the tool is positioned in the first end of the extension handle.

* * * * *